Aug. 26, 1969  E. R. FREITAS ET AL  3,463,603
METHOD OF SEPARATING ACIDIC GASES FROM GASEOUS MIXTURE
Filed March 17, 1967
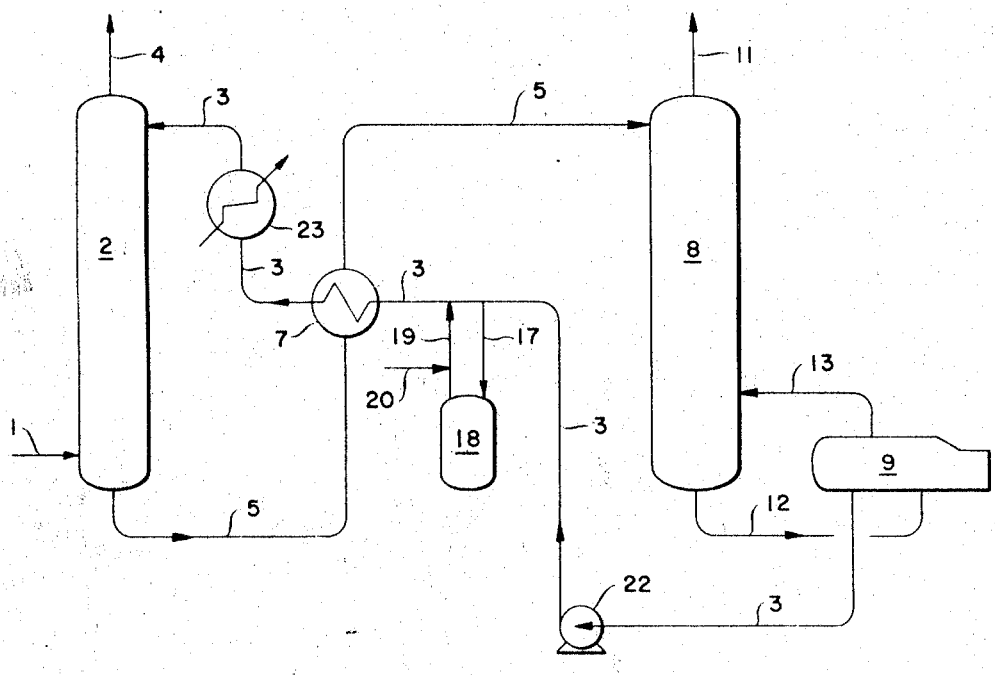
INVENTORS:
    ERNEST R. FREITAS
    CLARENCE L. DUNN
    KEITH E. ZARKER
BY: Marion W. Western
    THEIR ATTORNEY

United States Patent Office 3,463,603
Patented Aug. 26, 1969

3,463,603
METHOD OF SEPARATING ACIDIC GASES FROM GASEOUS MIXTURE
Ernest R. Freitas, San Leandro, and Clarence L. Dunn and Keith E. Zarker, Orinda, Calif., assignors to Shell Oil Company, New York, N.Y., a corporation of Delaware
Filed Mar. 17, 1967, Ser. No. 623,976
Int. Cl. B01d 47/02
U.S. Cl. 23—2
12 Claims

ABSTRACT OF THE DISCLOSURE

A process for separating acidic gases from a gaseous mixture by absorbing the acidic gases in a liquid absorbent comprising 20–40% by weight water, 35–65% by weight monoisopropanolamine and 5–45% by weight of a cyclotetramethylene sulfone, such as sulfolane, and recovering an essentially acid-free gas.

---

This invention relates to the separation of acidic gases from gaseous mixtures. More particularly, this invention relates to the separation of acidic gases from gaseous mixtures by means of a selective absorbent.

A number of methods have previously been proposed for the purification of mixtures of hydrocarbon gases contaminated with such materials as hydrogen sulfide, carbon dioxide and the like. Some of these methods involve the formation of alkanolamine salts of the acid gases, the salts being subsequently decomposed, usually by heating, to regenerate the solution utilized as an absorbent and to drive off the gas absorbed.

In many cases aqueous solutions of alkanolamines and the like are utilized. Such solutions have relatively limited solubility for acid gases. This results in a necessity for recycling and treating unduly large quantities of such solution. It also results in spending unduly large amounts of heat to regenerate such solutions. One of the biggest disadvantages of the use of such solutions is its pressure coefficient of solubility which leads to a limited solubility for the acid gases when the latter are under a high partial pressure. This results in unnecessarily high solvent circulation rates at high acid gas partial pressures for effective removal of acid gas from its admixture with hydrocarbons or other gaseous materials. Another potentially serious problem is that of foaming in the process equipment. This problem is often so significant that it is usually necessary to compensate for it by employing oversize contacting equipment.

Contrasted to the use of so-called "chemical solvents," (involving the formation of salts or other decomposable reaction products), certain classes of materials are regarded as "physical solvents." These include such materials as glycols which appear to act in a purely physical manner, absorbing acidic gases physically without the formation of any apparent reaction product. Mixtures of glycols with amines are known, particularly for the treatment of liquid hydrocarbon products for the removal of $H_2S$ and other acidic substances. However, glycols have not been found to be very efficient due to the limited solubility of acidic gases therein. Aqueous dispersions of glycols are no better in this respect and, moreover, may exhibit extreme corrosiveness toward processing equipment.

One of the disadvantages encountered, especially in the processing of gases initially having high partial pressures of acidic components, is efficient removal of the entire acidic component content both at the time the gas contains relatively high partial pressure of acid gas and after removal of the major proportion, i.e., at the time when the gas contains only a relatively low partial pressure of acid gases. None of the known absorbents are efficient in both respects.

A number of disadvantages have arisen in addition to those outlined above. The thermal stability of organic solvents presents a problem, especially during the stripping step wherein the fat solvent is heated to a temperature sufficient to cause a separation of the acid gases from the solvent. Under these conditions, it is often found that many solvents show decomposition. This decomposition often constitutes a major cost factor in the operation of the process and frequently leads to corrosion problems. Another operational disadvantage is the differential in temperature between that of the absorption column and in the stripping column. While a large part of this differential can be readily handled by heat exchanging the various streams involved in the process, nonetheless, it is often necessary to utilize external cooling means to cool the recycle stream of clean regenerated solvent to the absorber, as well as to employ heating means for heating the fat solvent coming from the bottom of the absorber column to the stripping column. Still another disadvantage of major significance comprises the stripping steam requirement for many solvents which also constitutes a major cost factor.

In Ser. No. 410,819, filed Nov. 2, 1964, now Patent No. 3,347,621 a process is claimed for the separation and recovery of acidic gases from mixtures containing the same, wherein efficient recovery is obtained and wherein the disadvantages stated above are overcome or minimized.

This is accomplished by contacting the gaseous mixture with a liquid absorbent comprising 15–65% by weight diisopropanolamine (DIPA), 1–25% by weight water, the balance being a cyclotetramethylene sulfone, e.g., sulfolane.

While this process overcomes many of the disadvantages associated with the prior art, it still has some drawbacks.

For example, in systems containing relatively high $CO_2$ concentrations, such as synthesis gas, the absorbent is not as effective as with high $H_2S$ concentrations, i.e., sulfolane is not as good a physical solvent for $CO_2$ as for $H_2S$. The chemical solvency of a given amine such as DIPA for an acid gas is based on the number of moles of amine present per unit volume of treating solution. In other words, at a given pressure and temperature the more moles of amine that will occupy a given volume of solution the more effective will be its chemical solvency toward acid gases. Diisopropanolamine is a relatively large molecule as compared with diethanolamine (DEA) and especially with monoethanolamine (MEA). As a resut it has been proposed to substitute an amine such as MEA for DIPA since for a given weight of alkanolamine in the treating solution there are more moles of alkanolamine per volume of solution with MEA than with DIPA. This has not been advantageous, however, since MEA forms two liquid phases under preferred operating conditions when contacted with acid gases.

Another disadvantage of the DIPA/sulfolane system is that at partial pressures of acid gases less than 150 p.s.i. and especially less than 50 p.s.i., the physical solvency of the cyclotetramethylene sulfone is not as high as desirable. At low partial pressures one must therefore rely primarily upon the chemical solvent, e.g., amine, to absorb the acid gas. Therefore, it is desirable to obtain the maximum chemical absorbent concentration at a minimum mole weight. Again, it is to be noted that MEA has been tried in such a system, but found to be disadvantageous in that upon absorbing acid gases it forms two phases at higher MEA concentration.

It has now been found that the attendant difficulties in the above-mentioned processes for the removal of $CO_2$ under high or low partial pressures and for the removal of $H_2S$ under lower pressures, e.g., under 150 p.s.i. and especially under 50 p.s.i., may be overcome by absorbing the acid gases in a liquid absorbent comprising 35 to 65 percent by weight of monoisopropanolamine (MIPA), 20 to 40 percent by weight water and 5 to 45 percent by weight of a cyclotetramethylene sulfone.

The drawing illustrates a preferred operation for removing $CO_2$ from synthesis gas.

The advantages of using the aqueous MIPA/sulfolane system for removing $CO_2$ from gas mixtures such as synthesis gas and $H_2S$ from mixtures wherein the partial pressure of $H_2S$ is below 150 p.s.i. are many.

One advantage stems from the fact that for a given weight of alkanolamine in the treating solution, there are more moles of MIPA per unit of volume than with DIPA or DEA. Thus, in order to absorb the same amount of acid gas with the MIPA containing solvent as with the DIPA containing solvent, a smaller volume of solvent will be involved. Therefore, processing equipment can be smaller and solvent circulation rates lower thereby lowering capital and operating costs.

Another advantage is that the MIPA containing solvent is less viscous and has higher thermal conductivity than the corresponding DIPA containing solvent and thereby favorably affects the surface requirements of the various heat exchangers, the absorber mass transfer rates and the pumping requirements.

Also, an additional advantage lies in the reduced heat duties of the solvent stripper and the "lean/rich" solvent exchanger when compared to the corresponding DIPA process scheme.

Perhaps the most important advantage of all lies in the rate of reaction of MIPA with acid gases as compared with DIPA. It has been unexpectedly discovered that MIPA containing solvent reacts about three times as fast as does DIPA containing solvent thereby considerably lessening contact time in the absorption zone.

An advantage of the process of the present invention over the corresponding aqueous MEA and DEA systems is that a single phase is maintained whereas in the ethanolamine solvents two phases form at high acid gas concentrations in the treating solution.

The principal attainment of the process of this invention is the high degree of removal, at very low solvent flows and heat loads, of $CO_2$ from gaseous mixtures wherein the partial pressure of $CO_2$ may vary from 0.01 to 1000 p.s.i. and of $CO_2$ and other acid gases such as $H_2S$ at partial pressures of less than 150 p.s.i.

An essential aspect of this invention lies in utilizing the proper proportions of MIPA and water. The absorption of acid gases according to the invention is primarily "chemical" in nature since under the operating conditions the cyclotetramethylene sulfone has reduced capacity for "physical" absorption of acid gases. This is due to the fact that the physical solvency of sulfolane increases as the partial pressure of the acid gas increases. Hence, at partial pressures below about 150 p.s.i., the physical solubility of the acid gases in sulfolane is low. Sulfolane is still an essential component of the liquid absorbent at these pressures, however, because it has some solvency and also has improved heat capacity over the corresponding aqueous alkanolamines, and in addition it prevents the foaming that is present when using aqueous alkanolamine absorbents.

The proper water-MIPA balance is especially important when absorbing $CO_2$ at partial pressures in excess of 150 p.s.i. The reaction product of $CO_2$ and MIPA is not highly soluble in sulfolane and in order to prevent phase separation, sufficient water must be present to maintain this product in solution. The water content therefore depends upon the MIPA content and should be sufficient to maintain a single phase when the MIPA becomes saturated with acid gas. An excess of water is not desired, however, as it increases the heat requirement and may cause foaming. From this, it is obvious to one with ordinary skill in the art that for a given MIPA concentration there are optimum water and sulfone concentrations. For example, when absorbing $CO_2$ at partial pressures of from about 0.01 p.s.i.a. to 400 p.s.i.a. at a temperature range of from 40° C. to 130° C., a solvent formulation of 40% by weight MIPA, 25% by weight water and 35% by weight sulfolane gives excellent results.

The sulfones which comprise compounds utilized in the process of this invention are based upon cyclotetramethylene sulfone, the basic and preferred species being sulfolane, otherwise referred to as thiophene tetrahydro-1,1-dioxide. Generally, sulfones having the general configuration:

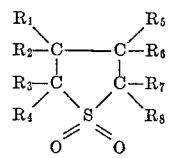

wherein at least four of the R substituents are hydrogen radicals, any remaining R's being alkyl groups having from 1 to 4 carbon atoms, each are suitable for use in the instant process. Suitable modifications or derivatives include 2-sulfolene; 2-methyl tetramethylene sulfone; 3-methyl tetramethylene sulfone; 2,3-dimethyl tetramethylene sulfone; 2,4-dimethyl tetramethylene sulfone; 3,5-dimethyl cyclotetramethylene sulfone; 2,5-dimethyl cyclotetramethylene sulfone; 3-ethyl cyclotetramethylene sulfone; 2-methyl-5-propyl cyclotetramethylene sulfone as well as their analogues and homologues. It is preferred that the number of alkyl radicals not exceed 4 and still more preferably that no more than 2 alkyl substituents are appended to the tetramethylene sulfone ring.

The gas mixtures to be treated in accordance with this invention may include flue gas, synthesis gas, refinery gas or natural gas. The particular advantage of the combined absorbent utilized in accordance with this invention is the high efficiency of absorption under relatively low partial pressures of acid gases. The latter may include hydrogen sulfide, mercaptans, carbon dioxide, and the like.

A typical gas for which the process of this invention may be utilized is a synthesis gas having the following composition:

| Component: | Mol percent concentration |
|---|---|
| Hydrogen | 61.6 |
| Nitrogen | 20.0 |
| Carbon monoxide | 0.3 |
| Argon | 0.2 |
| Methane | 0.2 |
| Water | 0.7 |
| Carbon dioxide | 17.0 |

The basic step in the process of the invention comprises intimate contacting between the gaseous mixture and the liquid absorbent mixture at pressures in the order of atmospheric to 1200 p.s.i., although even higher pressures may be employed in the case of $CO_2$. Countercurrent contacting is preferred in the absorption column, although this engineering detail may be varied according to specific plant design. A highly preferred aspect of the operation of the absorption column is to conduct absorption at temperatures between about 80° F. and about 275° F. (preferably 120–220° F.) and wherein the bottom of the absorption tower has a temperature between about 20 and about 150° F. higher than the temperature in the top part of the absorption zone. Normally, intimate contacting is effected in a vertically positioned tower, the sweet gas exiting from the tower near or at the top thereof while the fat absorbent solution (containing extracted acidic gases) leaves at or near the bottom of the tower.

In the case where superatmospheric pressures are employed in the contacting zone, the fat absorbent solution is conducted from the bottom portion of the absorption tower, leaving under high pipeline pressure, preferably in the case of natural gas treating, to a flashing zone wherein pressure is reduced to 10–200 p.s.i.g. for the purpose of removing a major portion of the acid gas and substantially all of any saturated hydrocarbons. In the same or a subsequent tower, referred to as a gas stripper, the remaining solution is reduced somewhat in pressure and heated to a temperature sufficient to volatilize the remaining acid gases and water therefrom, both of which exit at various ports near the top of the stripping tower. Alternatively, the fat solvent may be sent directly to the gas stripper column from the absorption column.

One of the chief advantages of the aqueous mixed solvent of one embodiment of the present invention is experienced during the stripping operation. The presence of the water has been found to enable the use of substantially lower stripping temperatures than are required when no water is utilized. Thus, it is possible to employ stripping temperatures between about 235 and 275° F. at pressures between about 0 and about 30 p.s.i.g. when water is present as compared with temperatures in the order of several hundred degrees F. higher for corresponding anhydrous solvent systems. It is immediately apparent that the use of these lower temperatures has several distinct advantages: first, the thermal degradation of the organic solvent fractions of the mixed solvent is greatly minimized; secondly, the differential in temperature between the absorption column and the stripping column is likewise held to a minimum, thus, making the heating and cooling requirements far less stringent than in the anhydrous solvent system.

Referring now to the drawing which shows a specific case, in point, a gas containing about 20% $CO_2$, the remainder being synthesis gas was utilized for treatment according to the process of the invention. The sour gas feed from the source 1 is injected into the lower section of the absorber 2 under a pressure of about 250 p.s.i.g., the temperature of the feed being about 100° F. The bottom of the absorption tower is at a temperature of about 205° F. while the top section of the absorber has a temperature in the order of 100° F. The lean mixed solvent comprising 25% by weight of water, 40% by weight of MIPA and 35% by weight of sulfolane enters the absorber by means of line 3 at a temperature of about 100° F. $CO_2$ and a small amount of the other gases are absorbed by the lean absorbent mixture from the sour feed. Sweet synthesis gas leaves the absorption section of the absorber tower by means of line 4.

The fat absorbent, containing absorbed $CO_2$ leaves the bottom of the absorber column 2 by means of line 5 and passes through lean/rich heat exchanger 7 to the stripper column 8 which is heated by means of reboiler 9. Preferably the fat solvent enters the acid gas stripper at a pressure of about 5 p.s.i.g. The bottom of the stripper is at a temperature of about 260° F. Under these conditions, $CO_2$ is stripped therefrom and leaves at the top of the stripper, by means of line 11.

The regenerated solvent leaves the bottom of the acid gas stripper by means of line 12 and passes into reboiler 9. Vapors from the heated solvent are passed back into stripper 8 via line 13. The remainder of the solvent leaves the reboiler through line 3 by means of pump 22. A slip-stream of solvent is taken from line 3 and fed through line 17 into solvent reclaimer 18 wherein any foreign substances accumulating in the solvent are removed by distillation thereby preventing a build-up of such substances in the lean solvent. The solvent thus reclaimed then passes through line 19 where it may be joined with make-up solvent from line 20 and passes back into line 3. The lean solvent is moved along line 3 and passes through heat exchanger 7 wherein the lean solvent is cooled in heat exchange relationship with the rich solvent. The lean solvent is then passed trrough lean solvent cooler 23 and into the top of absorption column 2 for further contact with the feed gas.

Preferably, the mixed aqueous solvent is employed in amounts of 0.4–0.8 mole of aqueous MIPA/sulfolane per mole of feed gas; however, this ratio may be altered depending upon the composition of the gas to be treated. The effluent from the absorber column contains less than 1000 p.p.m. and normally in the order of 200 to 500 p.p.m.

As mentioned earlier one of the principal advantages of the MIPA/sulfolane system over the DIPA/sulfolane system is due to the faster rate of reaction. In order to reduce the acid gas in the effluent from the absorber to the above-mentioned 500 p.p.m., 20 trays were needed in the absorber. When using a corresponding DIPA/sulfolane system 36 trays would be required to obtain a product effluent having 500 p.p.m. of acid gas. On the other hand, should 36 trays be used in the instant MIPA/sulfolane process, the product effluent would contain only about 50 p.p.m. of acid gas.

This process is also suited for the purification of natural gas and of hydrogen gas streams generated by the partial oxidation of heavy fuel.

In a steam methane reforming process carried out at a total pressure of 250 p.s.i.g. using a feed gas containing 17% by volume $CO_2$, the results show that the circulation of a solvent containing 25% w. water, 40% w. MIPA and 35% w. sulfolane is 30% lower than a corresponding solvent containing DIPA instead of MIPA.

We claim as our invention:

1. A process for separating acidic gases from a gaseous mixture which comprises contacting the mixture with a liquid absorbent comprising 20–40% by weight of water, 35–65% by weight of monoisopropanolamine and 5–45% by weight of a cyclotetramethylene sulfone and recovering an essentially acid-free gas.

2. The process according to claim 1 wherein the extracted acid gases are separated from the liquid absorbent containing the same and the liquid absorbent is recycled to contact additional amounts of said gaseous mixture.

3. The process according to claim 2 wherein the contacting is carried out at a temperature of from 80 to 275° F. and a partial acid gas pressure of 150 p.s.i. or less.

4. The process according to claim 3 wherein the acid gas containing liquid absorbent is subjected to a flashing operation at a reduced pressure, whereby hydrocarbons and a substantial proportion of the acid gases are flashed from the absorbent.

5. The process according to claim 4 wherein the absorbent from the flashing step is recycled to the absorption step.

6. The process according to claim 3 wherein the gaseous mixture is sour natural gas.

7. The process according to claim 3 wherein the gaseous mixture is a hydrogen synthesis gas.

8. The process according to claim 3 wherein the gaseous mixture is a refinery gas.

9. The process of separating carbon dioxide from a gaseous mixture which comprises contacting the mixture with a liquid absorbent comprising 20–40% by weight water, 35–65% by weight monoisopropanolamine and 5–45% by weight of a cyclotetramethylene sulfone and recovering an essentially carbon dioxide-free gas.

10. The process according to claim 9 wherein the contacting is carried out at a temperature of from 80 to 275% F. and at partial carbon dioxide pressure ranging from about 0.01 to 1000 p.s.i.

11. The process according to claim 10 wherein the proportion of water to monoisopropanolamine is sufficient to maintain in solution all of the product formed by the absorption of carbon dioxide in the liquid absorbent.

12. The process according to claim 11 wherein the gaseous mixture is hydrogen synthesis gas.

References Cited

UNITED STATES PATENTS

| | | | |
|---|---|---|---|
| 3,039,251 | 6/1962 | Kamlet | 23—2 X |
| 3,347,621 | 10/1967 | Papadopoulos et al. | 23—2 |
| 3,352,631 | 11/1967 | Zarker | 23—2 |

E. C. THOMAS, Primary Examiner

U.S. Cl. X.R.

55—68, 73